United States Patent [19]
Frick et al.

[11] Patent Number: 5,818,195
[45] Date of Patent: Oct. 6, 1998

[54] DUAL STATE CONTROLLER FOR BRUSHLESS ELECTRIC MOTORS

[75] Inventors: Thomas C. Frick, Maple Grove; Dennis R. Hipkins, Plymouth, both of Minn.

[73] Assignee: MCG, Inc., Eden Prairie, Minn.

[21] Appl. No.: 869,617

[22] Filed: Jun. 5, 1997

[51] Int. Cl.$^6$ ................................. H02P 1/32; H02P 7/48
[52] U.S. Cl. ...................... 318/771; 318/772; 318/773; 318/776
[58] Field of Search ..................... 318/138, 139, 318/245, 254, 769–771, 780, 781, 711, 715

[56] References Cited

U.S. PATENT DOCUMENTS

| | | | |
|---|---|---|---|
| 3,611,082 | 10/1971 | Schmitz | 318/187 |
| 4,413,218 | 11/1983 | Taylor et al. | 318/771 |
| 4,446,415 | 5/1984 | Taylor et al. | 318/798 |
| 4,477,760 | 10/1984 | Kuznetsov | 318/773 |
| 4,935,686 | 6/1990 | Stacey | 318/801 |
| 5,068,559 | 11/1991 | Satake et al. | 310/112 |
| 5,300,872 | 4/1994 | Smith | 318/768 |
| 5,352,960 | 10/1994 | Nakamura et al. | 318/772 |
| 5,614,799 | 3/1997 | Anderson et al. | 318/439 |
| 5,672,948 | 9/1997 | Cohen et al. | 318/603 |
| 5,675,230 | 10/1997 | Dunfield | 318/772 |
| 5,708,337 | 1/1998 | Breit et al. | 318/439 |

*Primary Examiner*—Paul Ip
*Attorney, Agent, or Firm*—Craig J. Lervick

[57] ABSTRACT

A controller is provided for use with electric motors which will achieve a two mode motor operation. In this operation, a first mode is utilized having a torque configuration thus more efficiently providing high torque outputs from the motor. However, a second configuration is also used which more efficiently accommodates high speed operations albeit at the expense of some output torque. The system accomplishes this two mode operation in a low cost manner so as to minimize the overall cost of products or devices utilizing this power control system.

17 Claims, 4 Drawing Sheets

VELOCITY VS WINDING CONFIG
DECISION GRAPH

DUAL STATE CONTROLLER FOR BRUSHLESS ELECTRIC MOTORS

BACKGROUND OF THE INVENTION

The present invention relates to a controller for brushless electric motors. More specifically, the present invention provides a control system for providing optimal operating conditions for a brushless electric motor.

In the field of electrically powered vehicles, such as scooters, golf carts, electric wheelchairs, etc., it is often necessary to operate under a wide variety of conditions. As is well known, when operating electrically powered vehicles, a wide variety of terrain is encountered including flat surfaces, hills, bumps and rougher terrain. Therefore, during the operation of an electric vehicle, it is necessary to have a power system which is capable of handling these various terrain conditions. For example, it would be desirable to provide an electric drive system which, at lower speeds, would provide maximum thrust so as to easily allow the navigation of hills, bumps, etc. It would also be desirable to provide an electric motor which, when running at higher speeds, would be optimized for this high speed operation. In such high speed operation, some amount of thrust can be sacrificed in an effort to maximize the speed.

It would be extremely beneficial to have an electrical motor which has multiple modes to accommodate these two operating conditions. A first mode could be used to optimize torque, especially at lower speeds. This low speed mode would provide more torque to overcome bumps, ridges, etc., however, would not be capable of providing higher speeds at the motor's output. Alternatively, the second mode of operation would be optimized for higher speed operation. This mode would be capable of providing higher speed outputs at the motor shaft, however, would do so at the expense of some torque. This mode would be extremely beneficial for use on flat terrain or once certain speeds have been achieved.

In all of these applications, the use of an electric motor has been widely accepted as a most effective and efficient alternative. Controlling speed of these motors typically involves providing a motor current proportional to the difference between a speed command signal and a speed sensor signal. However, speed sensors add cost to the system and size to the motor package.

Elimination of sensors for monitoring the operation of a motor, however, is not a task easily undertaken. These feedback sensors are an invaluable method of speed control which are not easily replaced. Therefore, most control systems have simply sought to reduce costs in other ways.

SUMMARY OF THE INVENTION

The present invention provides a "two mode-type" electrical motor for use in electrically controlled vehicles. These two "mode" provide two separate sets of operating conditions, each set being directed toward a specific mode of operation. More specifically, in a torque optimized "mode" or configuration, the motor can provide additional torque at its output; however, it is not capable of producing high speeds in an efficient manner. Alternatively, in a speed optimized "mode" or configuration, the motor is capable of efficiently achieving higher speeds, albeit at the expense of some output torque. The present system seeks to optimize these two characteristics by providing for a torque optimized configuration at lower speed and then switching to a speed optimized configuration at higher speeds. In this way, when a vehicle is operating at lower speeds it is capable of overcoming hills, bumps, or other obstacles that may be encountered which require additional torque from the electric motor. The system will also be capable of achieving higher speeds in a more efficient manner.

As is well known in the operation of three phase motors, the windings can be connected in the Δ or delta or Y configurations. Each of these configurations are efficient for certain operation; however, the overall operating characteristics of the motor changes when its connection configuration is changed.

The present invention provides relays to easily allow switching between each of these two configurations (Δ and Y configurations). The system also tracks the configuration in which the motor is placed so as to allow further evaluations based on this configuration.

Also, in an effort to minimize costs and expenses, the control for the present motor does not include a speed sensor. A speed sensor adds cost and volume. However, to properly control an electric motor in velocity mode, it is necessary to somehow monitor the speed thereof. This is especially true when switching between different configurations is to be based in part upon the actual motor speed.

In order to monitor the speed of the motor, the present invention utilizes a tachometer calculator as opposed to sensors. This tachometer calculator will monitor the phase current and terminal voltage from the motor during operation and, based on these values, calculate the motor speed. These calculations are accomplished utilizing well known motor equations.

As previously mentioned, the characteristics of an electrical motor will change based upon the power attachment configuration. More specifically, a motor connected in a Δ configuration has different characteristics than a motor connected in a Y configuration, as the constants utilized in motor equations are dependent upon the actual motor configuration. Therefore, in addition to monitoring terminal voltage and phase current, it is necessary for the tachometer calculator to also monitor the specific configuration of the motor.

As previously mentioned, the controller of the present invention includes the capability to supply power in either a Y or Δ configuration. Switching between these two configurations is accomplished either by manual switching or by automatic switching control.

The actual implementation of this dual gear feature requires the use of relays to provide appropriate switching. Again, relays can be a large source of cost and therefore it is necessary to utilize low cost relays. As is well known by those skilled in the art, when it is necessary for relays to switch large amounts of current, the cost will go up. Alternatively, lower cost relays can safely and easily switch lower amounts of electrical current. Therefore, by utilizing a system which minimizes the current during switching operations, lower cost relays are thus feasible and can be used. The controller of the present invention minimizes the current in relays before switching thus allowing for the use of these lower cost relays.

It is an object of the present invention to provide a motor controller with no velocity sensors. In this way, the motor cost and size remain low.

It is a further object of the present invention to provide a motor with a dual state operating characteristic such that torque can be optimized in one state and speed can be optimized in a second state.

It is a further object of the present invention to provide appropriate switching between configurations such that low cost relays can be used.

It is a further object of the present invention to provide a motor control system wherein motor speed is easily calculated utilizing known motor equations. This calculated motor speed can then be used in the control of the motor itself.

BRIEF DESCRIPTION OF THE DRAWINGS

Further objects and advantages of the present invention can be seen by reading the following detailed description in conjunction with the drawings in which.

DETAILED DESCRIPTION OF THE INVENTION

Figure 1:
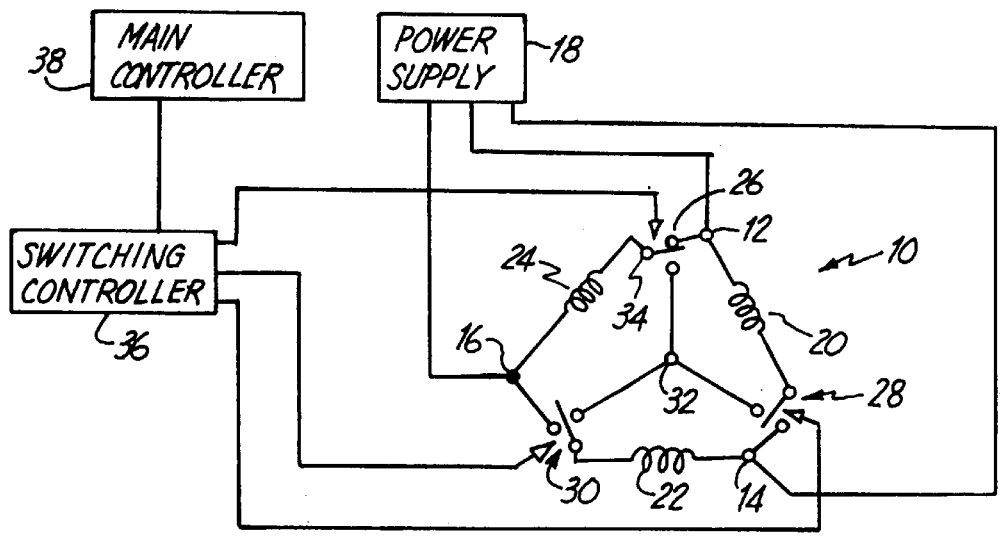
FIG. 1 is an illustration of the motor connection methodology which will allow connection in either the delta or Y configuration.

As mentioned, the present invention applies to the application and use of electric motors. In one embodiment of the invention, a three phase p.m. brushless electric motor is utilized in conjunction with a controller to provide two gear operating characteristics. Referring now to FIG. 1, there is shown a schematic diagram of the power supplying methodology used by the present invention. As is common in electric motor applications, power is supplied to the windings of the motor via a first connection terminal 12, second connection terminal 14 and third connection terminal 16. Each of these terminals are connected to a power supply 18. In this embodiment of the invention, power supply 18 provides three phase power to the motor 10. This will allow electrical power to be supplied to all windings of the motor, including a first winding 20, second winding 22 and third winding 24.

As previously mentioned, it is possible for motor windings in a three-phase motor to be connected in either a Δ or delta or Y configuration. In a Δ configuration, each winding is connected between two terminals of the three phase power supply. More specifically, referring to FIG. 1, first winding 20 would be connected between first terminal 12 and second terminal 14; second winding 22 would be connected between second terminal 14 and third terminal 16; and third winding 24 would be connected between third terminal 16 and first terminal 12. The connection scheme of the present invention to accomplish this Δ configuration includes a first relay 26, a second relay 28 and a third relay 30. When each relay is configured in a first position, the above mentioned delta connection is achieved.

In the aforementioned "Y" configuration, one side of a particular motor winding is connected to a single output from power supply 18 and the other side of the winding is connected to a common point. Referring again to the diagram of FIG. 1, this Y configuration is achieved by having the first side of first winding 20 attached to first terminal 12 and the second side of first winding 20 attached to common point 32. Similarly, second winding 22 has its first side attached to second terminal 14 and its second side attached to common point 32. Lastly, third winding 24 will have its first side attached to third terminal 16 and the second side attached to common point 32. Again, first relay 26, second relay 28 and third relay 30 are configured to allow this "Y" configuration. When each relay is in its second position, this Y configuration is achieved.

Specifically referring to the relays, the aforementioned first position will cause direct connection of the winding to the related terminal. For example, in first relay 26, while in its first position, connection between relay common point 34 and first terminal 12 is created. Similarly, in its second position, each relay will create a connection to common point 32. Again referring to first relay 26, the second position will allow direct connection between relay common point 34 and common point 32. As will be discussed more fully later, each specific configuration for powering the motor windings is beneficial to the operation of an electric motor. More importantly, it is very beneficial to allow the flexibility for connection in either configuration.

First relay 26, second relay 28 and third relay 30 are all controlled by a switching controller 36. Appropriate signals from switching controller 36 will cause first relay 26, second relay 28 and third relay 30 to be positioned in either their first position or second position. Additionally, switching controller 36 is connected to a main controller 38 which directs overall control operations of the present invention. As can be seen, main controller 38 is also connected to power supply 18. In this way, main controller 38 can appropriately monitor the operation of power supply 18 and switching controller 36 to monitor operation of the motor itself. As will be more fully described below, this includes appropriate monitoring and switching to achieve the aforementioned two mode operation.

Figure 2:
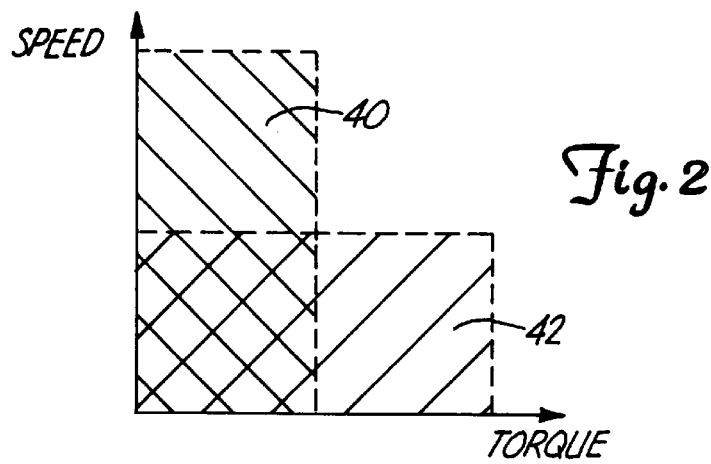
FIG. 2 is a motor characteristics chart illustrating the relationship between motor torque and speed.

Referring now to FIG. 2, there is a chart illustrating general operating characteristics of electric motors. This chart illustrates the relationship between speed and torque in an operating electric motor. In this chart, two separate regions are highlighted illustrating two desired optimization ranges for an electric motor. In a speed optimized range 40, the motor is capable of achieving high speeds while sacrificing some torque output. Alternatively, in a torque optimized range 42, the motor is capable of providing much higher torque while sacrificing some speed output. In the present embodiment, operation in speed optimized range 40 is achieved by a Δ connection configuration whereas torque optimized range 42 is achieved by a Y connection configuration. Each of these optimization ranges are beneficial dependent upon the desired operating characteristics of the motor. For example, when navigating or traversing rugged terrain, which includes curbs, bumps and other obstacles, it is beneficial to operate a motor in the torque optimized range. Alternatively, when operating in relatively flat terrain, some torque can be sacrificed to achieve greater speeds. Therefore, in the application of electrically powered vehicles, it is beneficial to have the ability to take advantage of both operating ranges.

In the controller of the present invention, no sensor is provided to monitor the motor speed. Such sensors are expensive and require additional space. Therefore, in an effort to keep the cost and size of the present control system low, the control system of the present invention utilizes other methodologies to monitor the motor speed.

The relationship between motor terminal voltage, speed, and phase current is well known and can be described utilizing the familiar motor equation (permanent magnet):

$$V_T = K_E \omega + IR_{526}$$

where:

$V_T$ is the terminal voltage, $K_E$ is the back EMF constant of the motor (in volts per 1,000 rpm or Krpm), ω is the motor speed (in Krpm), I is the phase current (in Amps), and $R_{526}$ is the phase-to-phase resistance (in Ohms).

For a given electric motor, the phase-to-phase resistance $R_{526}$ and the back EMF constant $K_E$ will be known. Therefore, by monitoring the motor terminal voltage $V_T$ and the phase current I, the motor speed can be calculated. By storing all these values and monitoring the phase current I and terminal voltage $V_T$, a tachometer calculator can be created wherein the speed of the motor is calculated rather than measured. While not completely accurate, as will be seen below, this calculation is sufficient to provide information for use by the present controller.

As previously mentioned, the switching capabilities of the present invention provide the motor with the ability to be connected in either a Y or Δ configuration. This provides large amounts of operating flexibility; however, complicates the above mentioned tachometer calculator. More specifically, the phase-to-phase resistance $R_\varnothing$ in the motor will change dependent upon the connection configuration. Therefore, the motor will have one value of phase-to-phase resistance $R_{\varnothing Y}$ when connected in a Y configuration while having a different phase-to-phase resistance $R_{\varnothing\Delta}$ when connected in a Δ configuration. Similarly, the back EMF constant $K_E$ for a motor will also vary depending upon the connection configuration. A different value for the back EMF constant will exist dependent upon the configuration or connection of the motor (i.e. for $K_{EY}$ for a Y connected motor and $K_{E\varnothing}$ for a Δ connected motor). Consequently, it is necessary for the system to store and monitor the motor configuration in order to accurately calculate motor speed. This is easily accomplished, however, as the same controller or system (main controller 38) will control switching into the respective configurations.

The separate motor configurations (Y connected versus Δ connected) also cause a difference in the operating characteristics of the motor. In essence, this can be seen as the "gear shift" within the motor. In a first configuration (the Y configuration), the motor is better suited to lower speed, higher torque operation whereas in a second configuration (the Δ configuration) the motor is better suited to a higher speed operation. Therefore, by switching between these two motor configurations (Y and Δ), a two gear operating characteristic is achieved.

In the present invention, the desired configuration or "mode" in which the motor is operating can be dependent upon the speed at which the motor is operating. Alternatively, the configuration can be selected by the user. When operating at lower speeds, it is assumed that more torque is desired for overcoming obstacles, climbing hills, etc. However, when the motor is operating at a higher speed, it is appropriate to switch to the "higher mode" or speed configuration.

Figure 3:
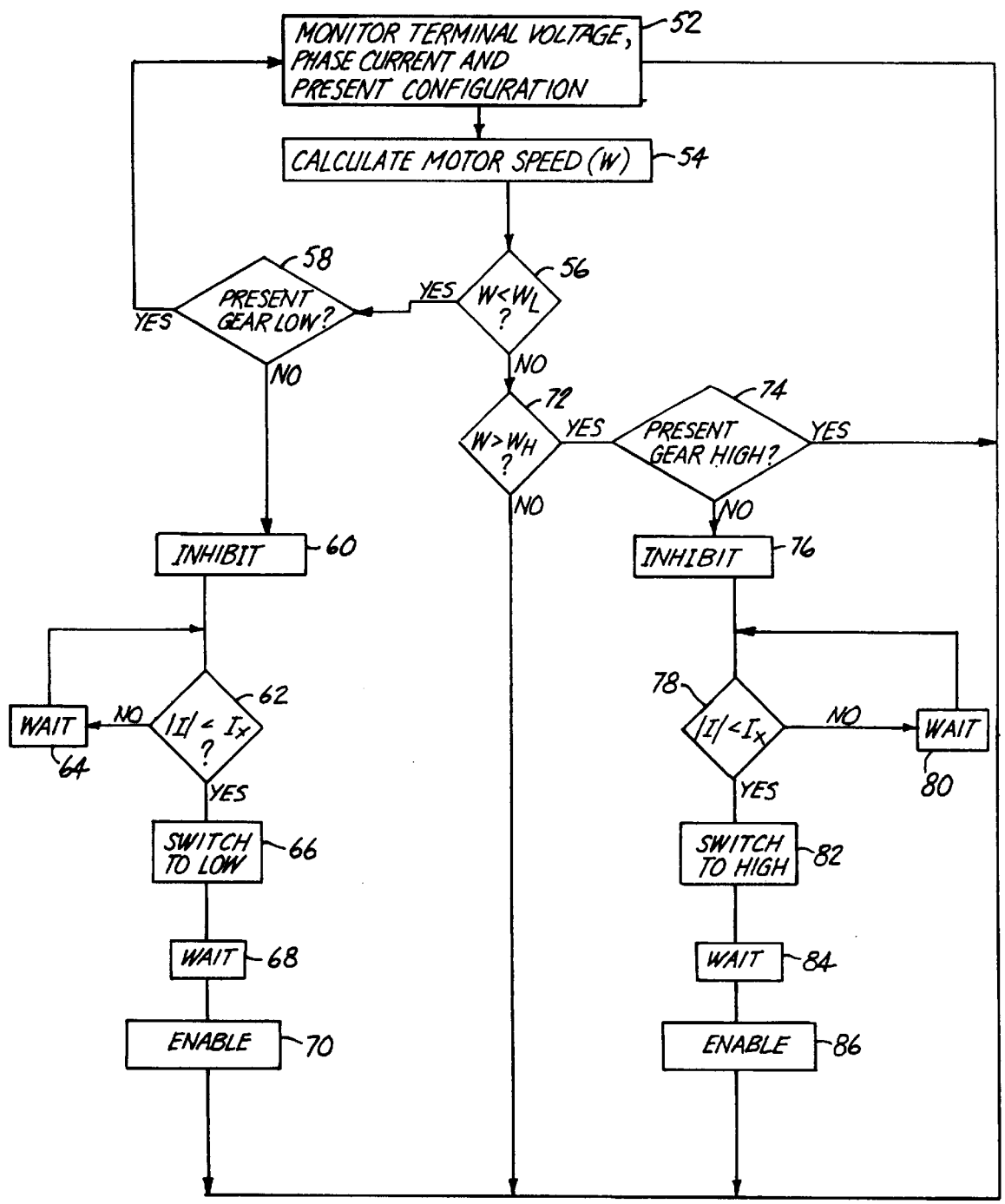
FIG. 3 is a flowchart outlining the steps carried out by the present invention during its operation.

Referring now to FIG. 3, there is shown a flowchart illustrating one embodiment of the control operation and methodology of the present invention. This illustrates the control methodology utilized to accomplish automatic shifting in the present invention. The system continually monitors the terminal voltage ($V_T$), phase current (I) and existing configuration of the motor (Δ or Y) in step 52. This monitoring may occur periodically, depending on the desired update rate or may be ongoing. Next, the system moves to calculation step 54 wherein the motor speed is calculated. This step also could be recognized as the tachometer calculator wherein motor speed is calculated rather than monitored using a sensor. Following calculation step 54, the motor speed is now known. Next, in decision step 56, the system determines whether the motor speed is below a threshold level $\omega_L$. As previously mentioned, the configuration of the motor is dependent upon the actual operating speed. When the system is powered up, the motor will be in its torque configuration or low speed configuration. The configuration will not be changed until the motor has reached a threshold speed where the "speed configuration" is more appropriate.

In decision step 56 if the system determines that the speed is below a threshold ($\omega_L$), the process will move to step 58 to determine if the present mode is low. If the gear is presently low, no changes are necessary and the method will loop back to step 52 in which the voltage and phase current are monitored.

Alternatively, if in decision step 58 it is decided that the present mode is high (i.e. it is not low), the system moves on to inhibit step 60. In this step, the drive motor is inhibited and current is no longer provided. In step 62, the system monitors the phase current present to determine whether this is below a switching threshold $I_x$. If the current is not below this threshold, the system moves to wait step 64 and delays for some predetermined time. Following this, the system will move back to step 62 and again test the current against the threshold $I_x$. As will be seen, this will continue, causing the system to wait until the current is actually below this threshold level. Once the current has diminished to a level below the threshold, the system moves on to step 66 in which the relays are switched, changing the configuration to a torque or low configuration. Next, the system will move to wait step 68 and delay a predetermined amount of time. This delay allows the relays to settle before current is reapplied. Once this delay has been achieved, the system will again enable the drive in step 70. Following this reconfiguration, the system will loop back to monitor step 52 and continue to monitor the motor operation.

Figure 4:
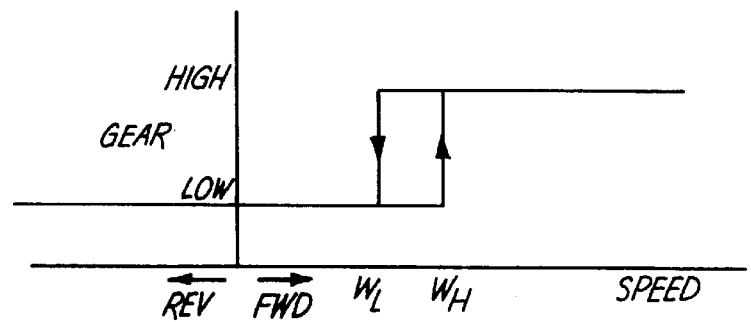
FIG. 4 is a graph illustrating the relationships between the speed and switching thresholds.

As noted in step 52, the change in configuration will be recognized and also monitored in this step. Now referring back to decision point 56 when the speed was tested against a low threshold level. If the speed is not below the low threshold, the system will move on to step 72 wherein the speed is tested against a high threshold. Referring now to FIG. 4, there is a graph showing the relationship between these speed thresholds and the appropriate "mode". As can be seen, the mode will not be switched to high until the speed exceeds the high threshold $\omega_H$. Similarly, the "mode" will not be switched to low until the speed is below a "low threshold" $\omega_L$. Additionally, when the speed is between these two threshold levels, no changes will be made to the drive configuration.

Referring back to FIG. 3, if it is determined that the speed is below the high threshold (i.e. the speed is between the low threshold and the high threshold), no changes are necessary and the system then returns to monitor step 52. Alternatively, if the speed is above the high threshold, the system moves on to step 74 to determine the present mode setting. The mode is set to high already, no further changes are needed and the system will return to monitor step 52. However, if the present mode is low, further action is necessary.

It is noteworthy at this point that the steps which will carry out the mode change are substantially similar to those previously described when switching from high to low in steps 60 through 70. More specifically, the system will start by inhibiting the drive in step 76. Next, in step 78, the current is monitored to determine if it is below a threshold level. If the current is not below this threshold, the system will move on to wait step 80 and allow the current to further diminish. Following a predetermined waiting time, the system will return to step 78 and continue to monitor the current. Once the current has reached a level below this threshold, the relays are switched to achieve a high configuration in step 82. Following this switching to a high configuration, the system again will wait a predetermined amount of time in step 84. This wait step allows for the settling of relays before current is applied. Following this predetermined wait period, the system will enable the drives in step 86 and continue its normal operation. Following this enablement of drives in step 86, the system will return to monitor step 52 and continue to monitor motor operation.

Referring back to step 66 wherein the gears are switched, this operation must be carefully carried out. As previously mentioned, the configuration and control system of the present invention utilizes numerous relays (first relay 26, second relay 28, and third relay 30) to switch between the two connection configurations. In a further effort to minimize the cost, size and weight of the device, it is necessary to use relatively small relays in this application. Such relays are not capable of performing switching while carrying large amounts of current. Therefore, it is necessary to inhibit the drive system and allow the phase current to drop below an acceptable level. Ideally, the switching will be performed when no current is being passed through the relays. In this way, no arcs are created between the relay contacts. By avoiding arcing between contacts, the life of the relays is greatly enhanced. In one embodiment of the invention, no switching occurs unless the current is below approximately 5 amps. This threshold level can be tailored to the specific application and needs of the application.

As can be seen from the above description, the control system is achieved which has a two mode operation to appropriately drive the motor in two separate optimized conditions. Further, the cost of the system is kept low by utilizing low cost relays and by not including sensors to monitor speed. Therefore, the system is smaller and less costly.

The above mentioned system described in FIGS. 3 and 4 has been disclosed in the context of an automatic switching configuration. It will be equally understood that in an alternative embodiment, the same concepts could be used in a manual switching configuration. In this context, the same relay and windings configuration is utilized to allow switching between the torque optimized configuration and speed optimized configuration. However, rather than having automatic switching controlled by a system controller, the switch could be actuated by a manual control.

Figure 5:
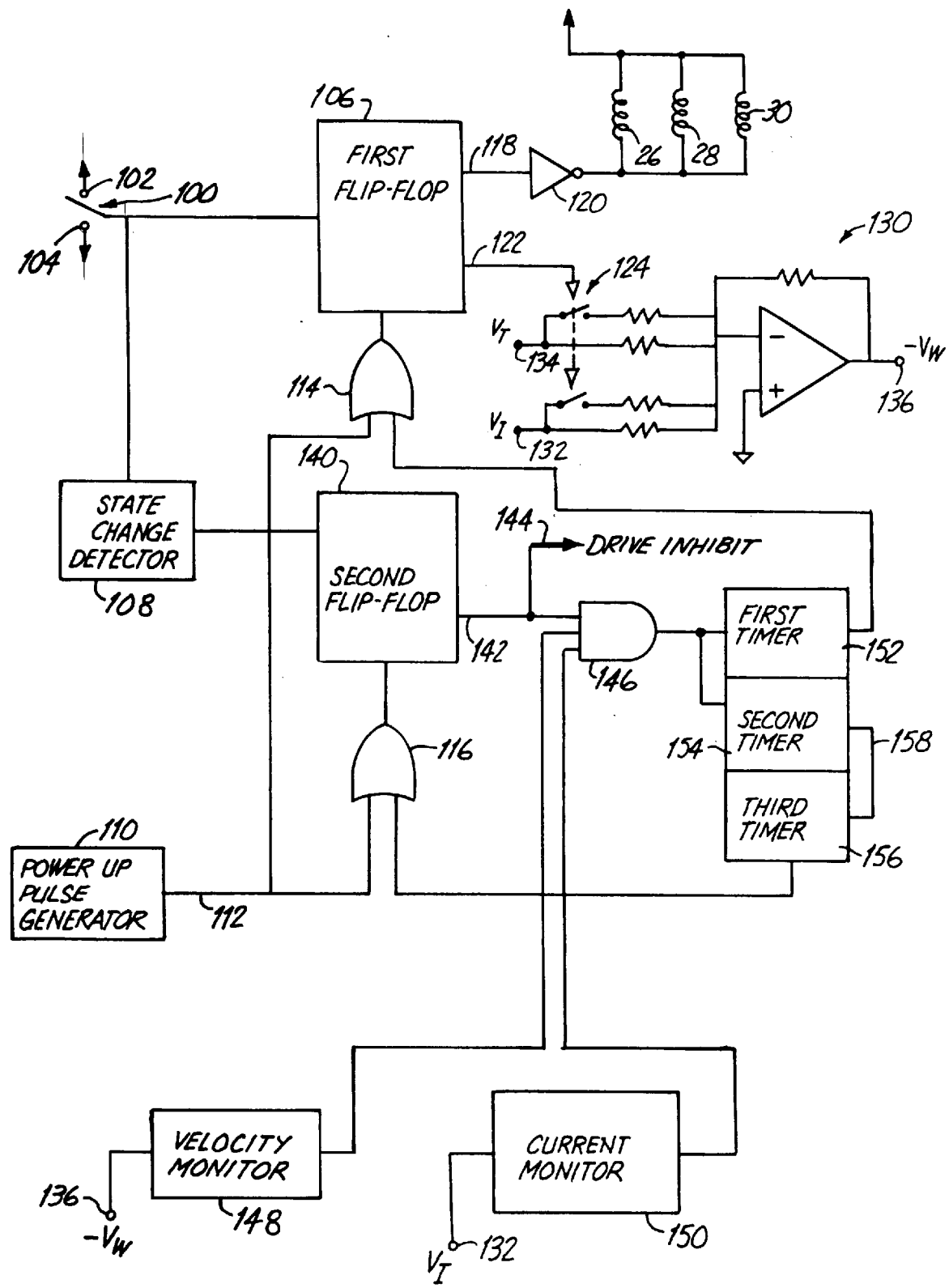
FIG. 5 is a schematic diagram illustrating the controller for manual shifting operation of the present invention.

Referring now to FIG. 5 there is shown a schematic diagram illustrating one embodiment of the present invention which utilizes a manual shifting operation. In this embodiment of the invention, a switch is utilized to select the high or low mode. More specifically, switch 100 is capable of being positioned in one of two positions. In a first position the switch will be connected to a high terminal 102 whereas in a second position the switch will be connected to a low terminal 104. These two positions can be used to select the mode of operation for the present motor. This signal is then transmitted to a first flip-flop 106 and a state change detector 108. The system also includes a power up pulse generator 110 which is utilized to ensure the system configuration is known following initial power up. More specifically, when the system is initially powered up, power up pulse generator 110 will provide a pulse at its output 112. This pulse is then transmitted to a first OR-gate 114 and a second OR-gate 116. First OR-gate 114 is utilized to clock first flip-flop 106, thus causing the state from the "gear select" switch to be produced at flip-flop output 118. This output is then provided to an inverting coil driver 120. The output of inverter 120 is attached to first relay 26, second relay 28 and third relay 30. These relays are switched to their appropriate positions.

A second output 122 from first flip-flop 106 is also attached to a multiplexer network 124 to adjust for appropriate gains to account for this configuration. As previously mentioned, the present invention uses a tachometer calculator to determine the motor speed. More specifically, the present invention uses summing network 130 to perform this calculation. Multiplexer network 124 is utilized to adjust the appropriate constants or gain to accommodate either the Δ or Y configuration of the motor. At a first input terminal 132 a signal indicative of motor current is presented, while a second input terminal 134 receives a signal indicative of terminal voltage. These signals are input to tachometer calculator 130 and a signal indicative of motor speed ($V_\omega$) is produced at output 136. This output signal will then be used by further devices within the present system to adjust operation according to calculated speed.

As previously mentioned, the present system provides mechanisms to establish the condition commanded by the state of the mode select switch 100 at startup. This condition will not be changed until a mode change operation is detected.

When mode select switch 100 is moved to a different position, this change is detected by state change detector 108. State change detector 108 will then produce a pulse at its output which is provided to second flip-flop 140. This pulse to second flip-flop 140 will cause its output 142 to go high. This signal is then provided to a drive inhibit mechanism which will inhibit drive of the motor. This transmission to the drive inhibit mechanism is achieved through connection 144. This output is also provided to AND-gate 146. Also connected to AND-gate 146 are a velocity monitor 148 and a current monitor 150.

Velocity monitor 148 has its input connected to the output of tachometer calculator 130 in order to monitor the calculated velocity signal $V_\omega$. This monitor will then output a high signal indicating when the velocity is within a range that is acceptable for shifting. For example, the acceptable velocity may well be some velocity below a predetermined threshold level. As mentioned, this output has been provided to AND-gate 146.

Similarly, current monitor 150 has its input connected to a signal indicative of motor current. This is the same signal which is monitored by tachometer calculator to calculate motor velocity. Again, current monitor 150 will monitor motor current and provide a high output signal indicating when this current is within a predetermined range. This predetermined range is previously defined as that current below which switching of the motor relays is acceptable. The output from current monitor 150 is then provided to AND-gate 146. In summary, AND-gate 146 output goes high when drive inhibit is high, the speed is within an acceptable range for shifting and when the current is also within an acceptable range for shifting.

AND-gate 146 has its output tied to a first timer 152 and a second timer 154. The output of first timer 152 is connected to first OR-gate 114. The output of second timer 154 is connected to a third timer 156. The output of this timer is then connected to the input of second OR-gate 116.

In operation, once AND-gate 146 goes high, this causes first timer 152 to produce a signal on its output which will be transferred to OR-gate 114. OR-gate 114 will then react by providing a signal to first flip-flop 106 which will actuate an actual change in the winding configurations. This is accomplished, as previously mentioned, by producing a signal at its output 118 which will eventually cause first relay 26, second relay 28 and third relay 30 to be actuated. Second timer 154 is configured to delay a certain period of time sufficient for the relays to make the physical switch. The output of second timer 154 is connected to the input of third timer 156 via a direct connection 158. The output of third timer 156 will then produce a signal to second OR-gate 116 at a point in time after which all switching is complete. Second OR-gate 116 will then produce a signal to second flip-flop 140 causing its output to be cleared and more specifically causing the drive inhibit signal 144 to be released. This will allow the drive to then be actuated and operation is now commenced in the new configuration.

Figure 6:
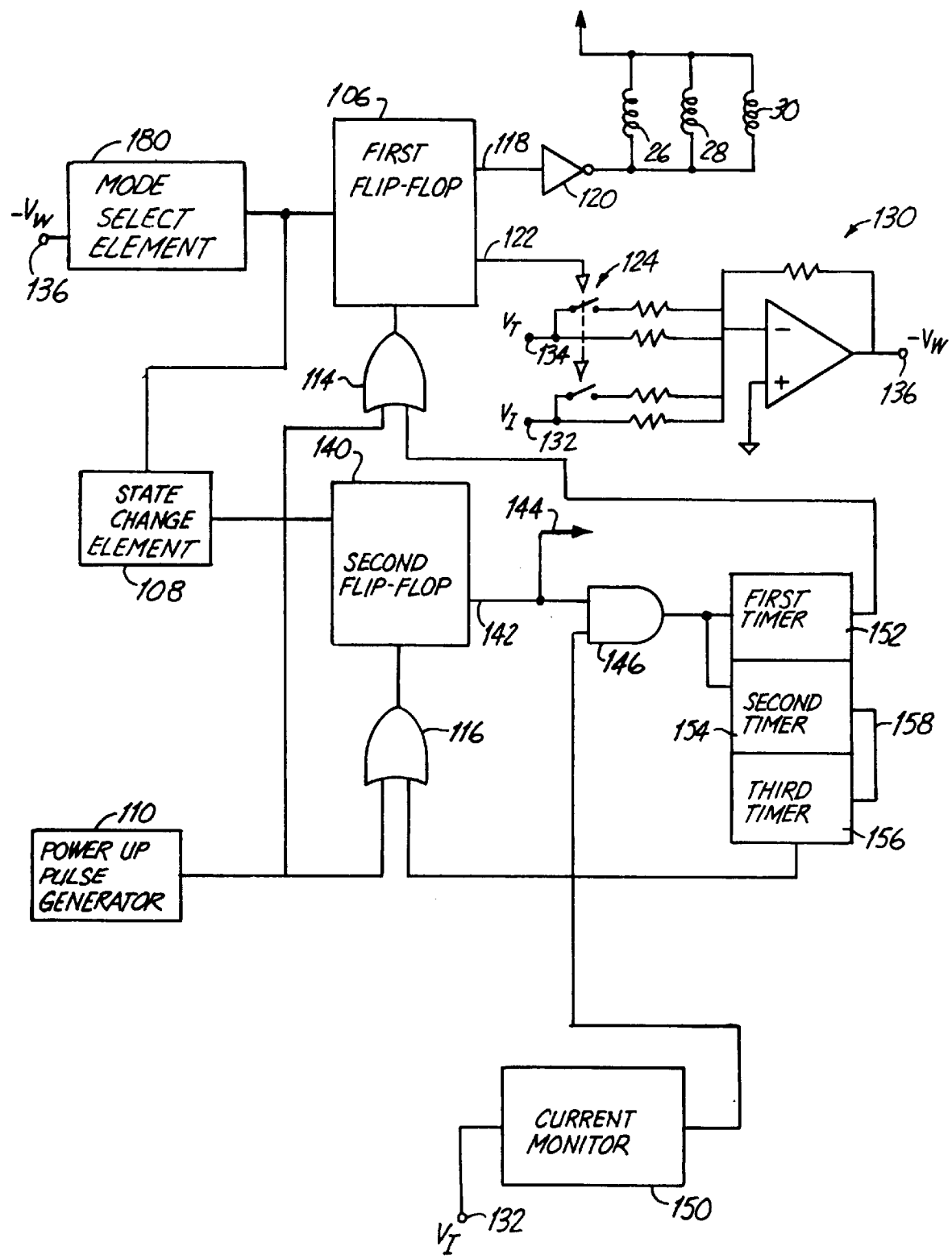
FIG. 6 is a schematic diagram illustrating the controller for automatic shifting operation of the present invention.

Referring now to FIG. 6 which illustrates an embodiment of the present invention which accomplishes switching between the two "modes" automatically. In this embodiment, circuitry very similar to that shown in FIG. 5 is utilized. Consequently, in these two figures like reference numbers are used to identify identical elements. Referring more specifically to FIG. 6, a first difference between the automatic shifting embodiment and the manual shifting embodiment is the elimination of selection switch 100 and its replacement by a mode select element 180. This device has an input from tachometer calculator 130 which is indicative of motor speed. Based upon the speed of the motor, the appropriate mode is selected. The selection can be better seen by referring to FIG. 4. The actual mode to be selected can be controlled by providing an appropriate signal on the output of gear select element 180, which is then provided to first flip-flop 106 and state change element 108. As mentioned with relation to FIG. 5, this will initiate the process of switching modes.

Also notable in this alternative embodiment is the elimination of speed window monitor as this function is properly carried out by gear select element 180.

The aforementioned description has described a system which utilizes two separate modes or configurations for motor operation. It will be equally understood by those skilled in the art that various different operating characteristics can easily be achieved. More specifically, additional switching could be provided to further alter the motor operating characteristics, thus providing additional "modes" which are adapted to certain situations.

Having illustrated and described the principles of the invention in the preferred embodiment, it should be apparent to those skilled in the art that the invention can be modified in arrangement and detail without departing from such principles. We claim all modifications coming within the scope and spirit of the following claims.

It is claimed:

1. A controller for providing electrical power to a brushless motor such that speed and torque are optimized during motor operation wherein the motor has a plurality of motor connection configurations, comprising:

sensing means for monitoring a connection configuration, a terminal voltage and a phase current in the brushless motor and outputting a configuration signal, a terminal voltage signal, and a phase current signal;

calculation means for receiving the configuration signal, the terminal voltage signal and the phase current signal, and for calculating a corresponding motor speed;

switching means for switching between a first motor connection configuration and a second motor connection configuration;

controlling means for receiving the calculated motor speed and the configuration signal and controlling the switching between the two configurations so as to achieve efficient and optimum switching between the first motor connection configuration and a second motor connection configuration.

2. The controller of claim 1 wherein the first motor connection configuration is a Y configuration and the second motor connection configuration is a delta configuration.

3. The controller of claim 1 wherein the switching means includes a plurality of relays, each relay being a low cost relay which is not capable of switching large amounts of current.

4. The controller of claim 3 wherein the plurality of relays includes a first relay, a second relay and a third relay.

5. The controller of claim 1 further comprising a configuration selection switch attached to the sensing means, wherein the selection switch allows a user to select the desired configuration.

6. The controller of claim 1 wherein the calculation means further comprises a summing network and a multiplexer, wherein the multiplexer receives the configuration signal and adjusts the summing network to account for the configuration.

7. The controller of claim 1 further comprising an automatic gear select element for receiving the configuration signal and calculated motor speed and automatically controlling the motor configuration according to a predetermined relationship between the calculated motor speed and the motor configuration.

8. A controller for accommodating operation of an electric motor in a plurality of operating configurations, the controller comprising:

a configuration selector having an output signal indicative of the appropriate operating configuration;

a switching device attached to the motor to allow switching between the plurality of operating configurations; and a tachometer calculator attached to the electric motor to monitor a plurality of operating conditions of the motor and attached to the switching device for producing a calculated motor speed based upon the operating configuration and the operating conditions of the motor, the tachometer calculator having an output for producing a signal indicative of the calculated motor speed; and a switching controller attached to the tachometer calculator, the switching device, and the configuration selector for managing the switching operations of the controller, wherein the switching between configurations will occur only when the operating conditions and calculated speed are within a predetermined range.

9. The controller of claim 8 wherein the configuration selector is a switch which allows for configuration selection by a user.

10. The controller of claim 8 wherein the configuration selector has a speed input attached to the output of the tachometer calculator and the appropriate operating configuration is dependent upon the calculated speed of the of the motor.

11. The controller of claim 8 further comprising a power-up controller for assuring that the motor is configured in a known configuration when power is first applied.

12. The controller of claim 8 wherein the operating configurations include a torque optimized configuration and a speed optimized configuration, wherein the torque optimized configuration is achieved by applying power to the motor in a Y connection configuration and the speed optimized configuration is achieved by applying power to the motor in a delta connection configuration.

13. The controller of claim 8 wherein the operating conditions monitored by the tachometer calculator and the switching controller include a terminal voltage and a phase current.

14. The controller of claim 13 wherein switching will not occur until the phase current is below a threshold level.

15. The controller of claim 14 wherein the threshold level is 5 amps.

16. The controller of claim 8 wherein the switching device includes a plurality of relays attached to the motor such that switching the relays to a first position will cause the motor to be powered in a Y connection configuration whereas switching the relays to a second position will cause the motor to be powered in a delta connection configuration.

17. The controller of claim 16 wherein the relays are capable of switching only when the current therethrough is below a threshold level.

* * * * *

UNITED STATES PATENT AND TRADEMARK OFFICE
CERTIFICATE OF CORRECTION

Page 1 of 3

PATENT NO. : 5,818,195
DATED : October 6, 1998
INVENTOR(S) : Thomas C. Frick et al.

It is certified that error appears in the above-indentified patent and that said Letters Patent is hereby corrected as shown below:

Item [56],
Title page, in the References Cited section:

Delete "5,300,872" and insert therefor --5,300,870--.

Delete "5,352,960" and insert therefor --5,352,964--.

Col. 1, line 55, delete "mode" and insert therefor --modes--.

Col. 2, line 45, delete "gear" and insert therefor --mode--.

Col. 3, line 33, delete "gear" and insert therefor --mode--.

Col. 3, lines 46-47, delete "a Δ or delta or Y configuration" and insert therefor --a Δ (delta) or a Y configuration--.

Col. 4, line 66, delete "$_{526}$" and insert therefor --$_{\theta}$--.

Col. 5, line 8, delete "$_{526}$" and insert therefor --$_{\theta}$--.

Col. 5, line 10, delete "$_{526}$" and insert therefor --$_{\theta}$--.

Col. 5, line 34, delete "$K_{c\theta}$" and insert therefor --$K_{E\Delta}$--.

UNITED STATES PATENT AND TRADEMARK OFFICE
CERTIFICATE OF CORRECTION

PATENT NO. : 5,818,195
DATED : October 6, 1998
INVENTOR(S) : Thomas C. Frick et al.

It is certified that error appears in the above-indentified patent and that said Letters Patent is hereby corrected as shown below:

Col. 5, line 43, delete "gear" and insert therefor --mode--.

Col. 5, line 48, delete "gear" and insert therefor --mode--.

Col. 6, line 16, delete "gear" and insert therefor --mode--.

Col. 7, line 17, delete "gears" and insert therefor --modes--.

Col. 8, line 4, delete "gear" and insert therefor --mode--.

Col. 9, line 8, "Second" should start a new paragraph.

Col. 9, line 35, delete "gear" and insert therefor --mode--.

Col. 9, line 41, delete "gear" and insert therefor --mode--.

UNITED STATES PATENT AND TRADEMARK OFFICE
CERTIFICATE OF CORRECTION

PATENT NO.    : 5,818,195
DATED         : October 6, 1998
INVENTOR(S)   : Thomas C. Frick, et. al.

It is certified that error appears in the above-identified patent and that said Letters Patent is hereby corrected as shown below:

Claim 10, Col. 10, line 63, the words "of the" are duplicate. Delete one usage.

Signed and Sealed this

Sixth Day of April, 1999

Attest:

Attesting Officer

Q. TODD DICKINSON

Acting Commissioner of Patents and Trademarks